United States Patent
Brodigan

(10) Patent No.: US 6,219,355 B1
(45) Date of Patent: Apr. 17, 2001

(54) VIDEO AND DATA COMMUNICATION SYSTEM

(75) Inventor: Donald L. Brodigan, Broomfield, CO (US)

(73) Assignee: Qwest Communications International Inc.

( * ) Notice: Subject to any disclaimer, the term of this patent is extended or adjusted under 35 U.S.C. 154(b) by 0 days.

(21) Appl. No.: 09/200,630

(22) Filed: Nov. 30, 1998

(51) Int. Cl.[7] .............. H04L 12/28; H04J 3/26; H04N 7/10; H04N 7/14

(52) U.S. Cl. .............. 370/486; 725/86; 725/91; 725/114; 370/395

(58) Field of Search .............. 379/201, 100.04; 370/352, 353, 401, 436, 354, 432, 355, 395, 396, 400, 486; 709/246; 455/4.1, 4.2, 3.1, 5.1; 725/86–87, 91–93, 114, 116

(56) References Cited

U.S. PATENT DOCUMENTS

| | | | |
|---|---|---|---|
| 5,420,923 * | 5/1995 | Beyers, II et al. | 380/20 |
| 5,629,978 * | 5/1997 | Blumhardt et al. | 379/201 |
| 5,650,994 * | 7/1997 | Daley | 370/259 |
| 5,666,487 * | 9/1997 | Goodman et al. | 709/246 |
| 5,696,765 * | 12/1997 | Safadi | 370/436 |
| 5,734,652 * | 3/1998 | Kwok | 370/395 |
| 5,917,537 * | 6/1999 | Lightfoot et al. | 379/100.04 |
| 5,923,361 * | 7/1999 | Sutton, Jr. | 348/8 |
| 5,978,381 * | 11/1999 | Perlman et al. | 370/432 |
| 6,014,381 * | 1/2000 | Troxel et al. | 370/395 |
| 6,028,860 * | 2/2000 | Laubach et al. | 370/395 |
| 6,041,056 * | 3/2000 | Bigham et al. | 370/395 |
| 6,049,539 * | 4/2000 | Lee et al. | 370/355 |

* cited by examiner

Primary Examiner—Ajit Patel
Assistant Examiner—Hanh Nguyen
(74) Attorney, Agent, or Firm—Brooks & Kushman P.C.

(57) ABSTRACT

A broadband video and data communication system includes a headend having a video channel provider and a data service provider. A host digital terminal communicates with the headend. A network interface operates to communicate through the host digital terminal to communicate with the video channel provider and bi-directionally communicate with the data service provider. A selection device located at the network interface operates to send information to and receive information from the headend. A video server in communication with the video channel provider operates to send a video channel through the video channel provider to the selection device. The video server is configured for bi-directional communication with the data service provider and for operating to send and receive data information, through the data service provider, to and from the selection device.

11 Claims, 2 Drawing Sheets

VIDEO AND DATA COMMUNICATION SYSTEM

TECHNICAL FIELD

The present invention relates to communication systems for providing video and/or data services.

BACKGROUND ART

An existing service provider, which may be a video information provider, a data service provider, or a video and data provider, has a central office from which information is communicated to a network interface. For example, a coaxial cable may run from the office through a neighborhood, and have numerous physical drops that run into customer houses. The network interface, at the end of a physical drop, connects to a set top box that is used by the end user to select desired items for reception as video or data items. In these existing systems, the provider's entire bandwidth of information is sent from the office, and is present at each physical drop. As such, the set top box or selection device has access to all of the bandwidth, and if desired, may be programmed to allow or forbid access to certain portions of the entire bandwidth of information.

Although these existing systems have been employed in many video and/or data communication systems that have been commercially successful, there are inherent disadvantages in these types of systems. For example, beside the user having the ability to select from a variety of different channels, other services are typically very limited. More particularly, although there are a growing number of services available over a network that has a physical drop at a customer's home, such as services available through sites on the worldwide web, a customer must take a number of steps to obtain these services. More particularly, a customer must have some form of Internet access available, log onto the Internet through a service provider, and then locate the website of the party that offers the desired service. For example, it may be possible to subscribe to a newspaper or magazine by filling out a form on a website.

However, a person may not enjoy or may not be comfortable with the Internet as a medium for requesting service. Still further, a person may not have a home computer.

For the foregoing reasons, there is a need for an improved video and data communication system that overcomes the problems and limitations of the prior art.

DISCLOSURE OF INVENTION

It is, therefore, an object of the present invention to provide a broadband communication system that allow an end user to access services available at a video server conveniently from a set top box or selection device.

In carrying out the above object, other objects, and features of the present invention, a broadband video and data communication system is provided. The system comprises a headend having a video channel provider and a data service provider, a host digital terminal in communication with the headend, and a network interface. The network interface is operative to communicate through the host digital terminal so as to allow communication with the video channel provider. The network interface allows bidirectional communication with the data service provider.

The system further comprises a selection device located at the network interface, and a video server in communication with the video channel provider. The selection device is operative to send information to and receive information from the headend. The video server is operative to send a video channel through the video channel provider to the selection device. The video server is in bi-directional communication with the data service provider. Further, the video server is operative to send and receive data information, through the data service provider, to and from the selection device.

Preferably, the system further comprises a network unit between the host digital terminal and the network interface with the network interface connected to the network unit. At least one additional network interface is connected to the network unit. The host digital terminal identifies each different network interface with a unique identification tag.

Preferably, the identification tag includes a host digital terminal number, a network unit number, and a network interface port number. Further, in a preferred embodiment, upon request for the video channel, the video channel provider sends the video channel and the host digital terminal sends the identification tag to the selection device. Further, the video server has an address, and the host digital terminal sends the address for the video server to the selection device.

Still further, preferably, the host digital terminal assigns an address to the selection device, and the selection device, upon receiving the identification tag and the video server address, sends the address for the selection device to the video server along with the identification tag.

Preferably, the headend communicates with the selection device over an asynchronous transfer mode (ATM) network. Further, the video server preferably communicates with the video channel provider over an ATM network. Still further, the video server preferably communicates with the data service provider over a packet switched network, such as an Internet Protocol (IP) network.

Further, in carrying out the present invention, a method for use in a broadband video and data communication system is provided. The method comprises configuring the video server for bidirectional communication with the data service provider. Further, the video server is configured for operation to send and receive data information, through the data service provider, to and from the selection device.

The advantages associated with embodiments of the present invention are numerous. For example, embodiments of the present invention may be implemented with a telephone video server as the video server. As such, the telephone video server may provide an application program interface (API) to the selection device through the data service provider when the video channel is requested. The application program interface may include a plurality of different selectable services, such as telephone order requests, voice messaging, caller identification, speed dialing, billing information access, or any other service options desired.

Thus, embodiments of the present invention provide a much needed simplification of services. An end user may access services at the video server by simply using their selection device or set top box, or even with a remote control. For example, a customer may review voice messages, or even order an additional telephone line or change phone services with their set top box or even the remote control. Further, a home computer is no longer needed to access a plurality of different services, as with embodiments of the present invention, a television and set top box may be used instead.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
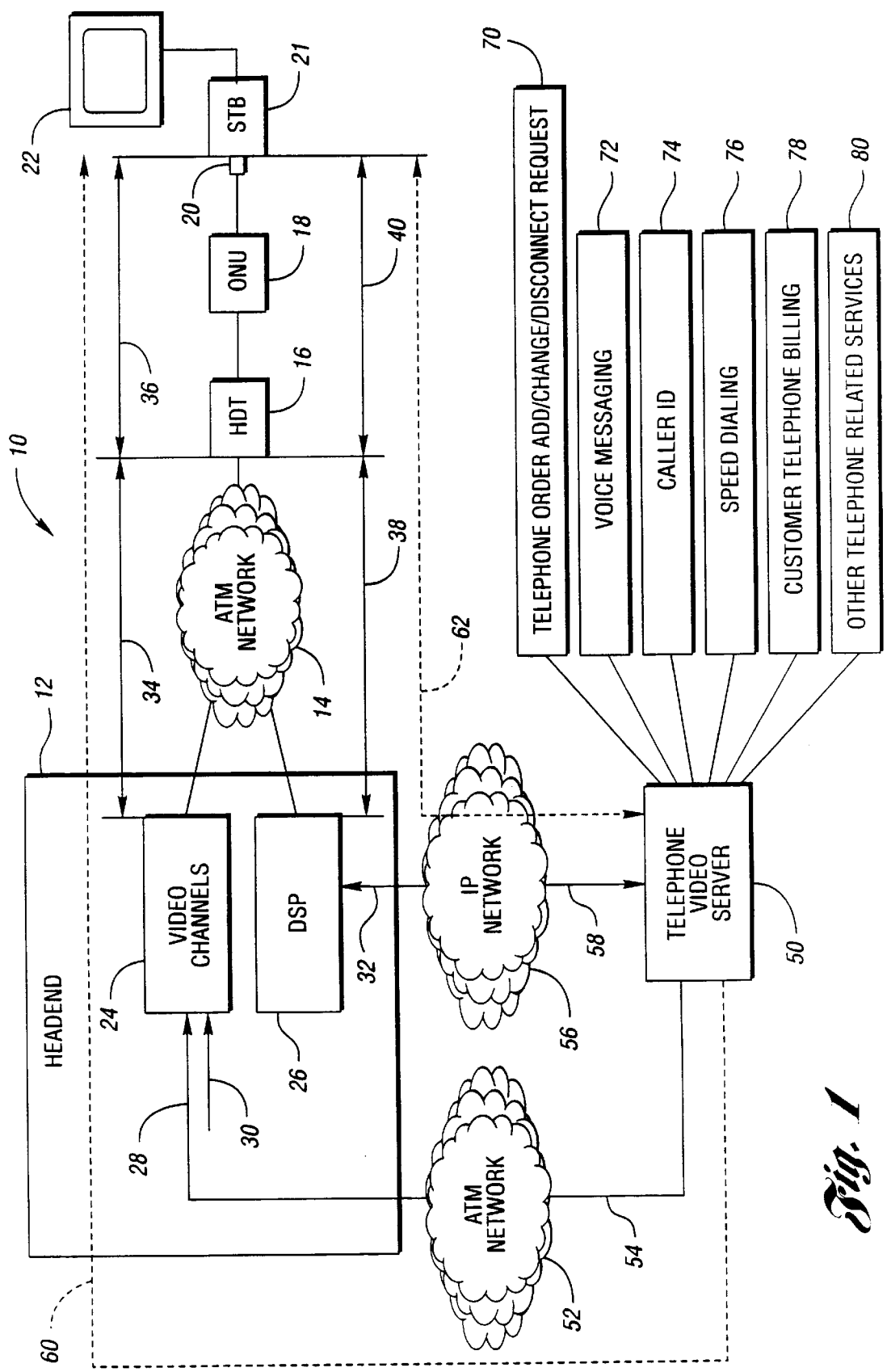
FIG. 1 is a diagram illustrating a system of the present invention for providing services from a video server to a selection device or set top box.

With reference to FIG. 1, a system of the present invention for communicating video and/or data information is generally indicated at 10. System 10 includes a headend 12. Headend 12 is generally the gathering place for all information that will eventually reach the end user. Information from headend 12 is sent over a network 14. Network 14, as shown, is an asynchronous transfer mode (ATM) network. Of course, other networks may be suitable and it is to be appreciated that ATM network 14 is merely one example of a suitable network for connection to headend 12. A host digital terminal 16 (HDT) communicates with ATM network 14. System 10 includes a plurality of host digital terminals 16, and only one is shown for convenience in illustration. Of course, as few as one host digital terminal, or any number of host digital terminals may be provided. Host digital terminal 16 acts as a central office and communicates with a plurality of network units 18. Again, only one network unit 18 is shown for convenience. Of course, any number of network units 18 may be provided.

Network unit 18 shown as an optical network unit (ONU) may be any one of a variety of types including, for example, a broadband network unit (BNU) or a universal service access multiplexer (USAM). Network unit 18 connects to at least one network interface 20. Of course, any number of network interfaces 20 may be connected to network unit 18 and the appropriate number of network interfaces may be determined based on physical distances and available bandwidths at various portions of system 10. The connection between network unit 18 and network interface 20 is preferably either copper twisted pair or coaxial cable. Further, the other connections from network unit 18 back to headend 12 are preferably fiber. Of course, the use of fiber, copper twisted pair, and coax cable is exemplary, and other mediums may be suitable as is appreciated by one of ordinary skill in the art.

Network interface 20 may be, for example, located at the side of a customer home. Within the home, a set top box (STB) 21 is connected to network interface 20. In accordance with the present invention, the set top box 21 is used to send and receive information to and from headend 12, through the various components in between.

As shown, a television 22 is connected to the set top box 21. Of course, it is to be appreciated that if desired, a set top box 21 may be incorporated within television 22.

As the path from headend 12 to the set top box 21 at network interface 20 has been described, it is to be appreciated that one of ordinary skill in the art may contemplate various modifications between headend 12 and network interface 20 which are all within the spirit of the present invention.

Headend 12 has a video channel provider 24 and a data service provider 26. Video channel provider 24 receives video programming information from a variety of sources such as source 28 and source 30. For example, video channel provider 24 may receive video programming from satellite downlink, direct connection, airwaves, or any other source of video information. Further, data service provider receives data information from source 32, in addition to any number of other sources (not shown).

Video channel provider 24 is operative to establish a permanent virtual circuit or PVC (virtual path identifier/ virtual channel identifier or VPI/VCI) through the ATM network to the host digital terminal or HDT. Further, the permanent virtual circuit extends from host digital terminal 16 to the set top box 21 at network interface 20. As such, an electronic programming guide (EPG) may be sent from the video channel provider 24 to the set top box 21 at network interface 20.

Further, data service provider 26 is operative to establish an impulse pay-per-view (IPPV) permanent virtual circuit (PVC) from data service provider 26 through ATM network 14 to host digital terminal 16. Further, the connection continues from host digital terminal 16 to the set top box 21 at network interface 20.

Communication between video channel provider 24 and the set top box 21 is indicated by arrows 34 and 36. Communication between data service provider 26 and the set top box 21 is indicated by arrows 38 and 40.

A video server 50 is in communication with headend 12. In a preferred embodiment of the present invention, video server 50 is a telephone video server. Of course, other video servers that provide services to an end user through headend 12 may be used in addition to telephone video server 50, or substituted therefor. Video server 50 communicates through ATM network 52, as indicated by line 54, to video channel provider 24 at source 28. Of course, an ATM network is a preferred network, but other networks may be suitable as well as appreciated by one of ordinary skill in the art. Further, video server 50 communicates through IP network 56, as indicated by line 58, with data service provider 26 at source 32. Of course, an IP network is preferred, but other packet switch networks or even any other network may be suitable for certain applications as would be appreciated by one of ordinary skill in the art.

As such, video server 50 may establish a telephone video channel from video server 50 to the set top box 21 at network interface 20 as indicated by dotted line 60. Further, telephone video server 50 may establish a bidirectional communication path from video server 50 to the set top box 21 at network interface 20 as indicated by dashed line 62. The specific details of the cooperation of video server 50, headend 12, and the set top box 21 will be further described. However, it is to be appreciated that video server 50 may provide a variety of different services such as telephone order add/change/disconnect request 70, voice messaging 72, caller identification 74, speed dialing 76, customer telephone billing service 78, or any other telephone-related services 80.

With continuing reference to FIG. 1, operation of system 10 in a preferred embodiment will now be described in detail. Of course, the following description of a preferred embodiment for operation of system 10 includes many particular details of operation that are preferred for implementation, however, one of ordinary skill in the art appreciates that there are many alternatives that may be suitable based on the specifics of a particular system.

Video server 50 sends a channel to video channel provider 24 that is part of the customer's basic channel line-up. When a customer turns on the set top box 21, the set top box 21 signs onto the network by signing onto the host digital terminal 16. The bidirectional data path 38 and 40 from data service provider 26 to the set top box 21 is established at this time. Further, the paths 34 and 36 from video channel provider 24 to the set top box 21 are established to send the electronic program guide (EPG). In addition to sending the EPG, the IP address for video server 50 is also sent from headend 12 to the set top box 21 at log-on. Headend 12, and more particularly data service provider 26, assigns the set top box 21 an IP address. This IP address is preferably dynamic. When the customer selects the channel assigned to the video server 50, host digital terminal 16 connects the set top box 21 to the video server video source at host digital terminal 16. Host digital terminal 16 returns acknowledgment to the channel change request to the set top box 21. Included with the acknowledgment is an identification tag. The identification tag preferably includes a host digital terminal number, a network unit number, and a network interface port number. This provides a physical identification of the drop that is serving a customer or business address.

The video channel includes motion picture experts group (MPEG2) private data packets which are used to load an application program interface (API) in the set top box 21 which will display a menu of choices. For example, choices 70, 72, 74, 76, 78 and 80 may appear in the API. The API loaded into the set top box 21 not only allows the set top box API to be displayed on the TV screen 22, but it enables the user remote control to interact with the menu items displayed on the TV menu.

For example, a user may select voice messaging with the remote control, and the set top box 21 sends a request to receive any voice messages that may be recorded. If there are multiple messages, the user will step through each one, one at a time, and can also choose to save the message or delete the message. All this is done using the TV remote control. The voice retrieved message is sent to the video server 50 over the impulse pay-per-view permanent virtual circuit 38 and 40 using the video server's IP address sent in the EPG. The identification tag is also sent over the IPPV PVC to identify the physical drop to video server 50. Using the identification tag, server 50 connects to a voice messaging system and retrieves any messages stored.

Video server 50 preferably encodes voice messages into an MPEG2 audio stream that is sent over IP network 56 and over IPPV (ATM PVC) 38 and 40 to the set top box 21 using the set top box IP address. The set top box decodes the MPEG2 audio and sends it to the TV audio for the customer to hear. The identification tag (for example, the HDT number, ONU number, and port number) are key to identifying the physical customer drop requesting telephone-related services (or other services) and will only match to a single physical home ensuring that only that customer has access to the information. Other security measures can be implemented including sending log-on and password to the video server 50. The user can continue to select items in the menu as long as they are connected to the video server's channel. The IPPV ATM communications path can also be used to send graphic and small video clips that are specific to the customer selection from the menu. The API loaded in the STB would be used to encode the information sent in the IPPV channel and display it on the TV screen. When the customer selects another video channel, the API and the STB will be terminated and will be reactivated the next time the user selects the video server's channel.

In the case of the caller ID service, once the user has selected the video server's channel and established a two-way path between the video server and the STB, the caller ID could be transmitted to the STB over the IPPV PVC to the STB and display it on the TV. This is a different path than is normally used. Normally, the caller ID is transmitted on the user's phone line and it would have to be connected to the STB in order to be displayed on the TV. This eliminates that requirement.

Figure 2:
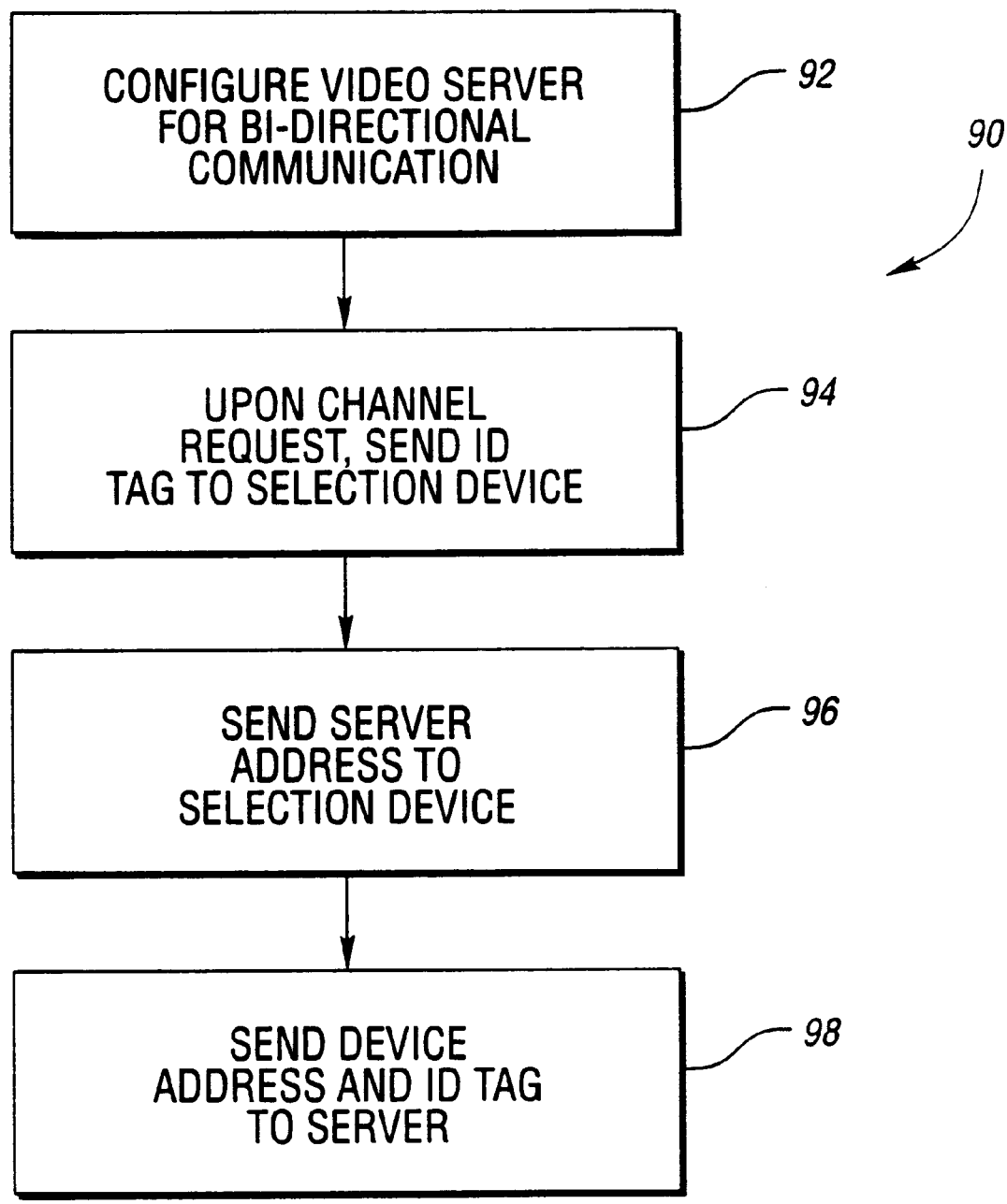
FIG. 2 is a block diagram illustrating a method of the present invention for simplifying end user interaction to achieve services.

With reference to FIG. 2, operation of system 10 (FIG. 1) will now be described in general. At block 92, the video server is configured for bi-directional communication. At block 94, upon channel request, an identification tag is sent to the selection device (set top box). At block 96, the video server's address is sent to the selection device. At block 98, the selection device's address and identification tag are sent to the video server.

Further, in addition to the detailed description of a preferred implementation of system 10 given previously, there are additional preferences in implementing the preferred embodiments of a telephone video server, and the preferred embodiment for the set top box 21. For example, the IP address of the STB (customer's address) is preferably stored in the non-volatile memory space in the STB just in case there is a power outage. This IP address can be changed and its new IP address will be updated in the next EPG automatically sent to all STB. If the IPPV connection is lost for any reason including loss of power to the STB, the STB will reestablish the IPPV PVC. When reestablishing an IPPV PVC, the STB retransmits a message to the video server 50 with the current IP address of the STB itself and the stored identification tag. This ensures that the video server 50 has the correct IP address assigned to that physical drop.

In a preferred implementation, video server 50 polls all active IP addresses for an update to verify that the IP address matches the identification tag it has received before. This requires that the STB respond with the IP address of the STB and the identification tag. This could be done, for example, daily around 3:00 a.m. One reason for polling is to make sure that the path to each of the STBs still exists and if not, remove the IP address from the active list in the telephone video server (or other server). A second purpose is to detect a set top box that has been moved to another location being served by a different physical broadband media cell drop (or other type of drop). In that way it will prevent false access by another customer at another location to telephone information they should not have access to.

Still further, the video server 50 preferably has the ability to manually reset the information stored in the set top box 21. As such, the identification tag is set to a null value and may only be reset to the proper value by re-logging on to the video server's channel. Still further, the video server's channel may be implemented on a pay-per-view basis, requiring a customer to subscribe to that channel to take advantage of the embodiments of the present invention.

Several services that may be implemented in a preferred embodiment of the present invention, in which the video server 50 is a telephone video server, are described. Of course, other services may be employed as desired.

Existing caller ID services are provided over the normal phone line and require a special device in the home. By using the telephone signaling system 7 (SS7) network and advanced intelligent network (AIN) capability connected to the telephone video server, this same message can now be delivered over the broadband video service to any TV in the home that has subscribed to the service. The message waiting can now be sent by linking the voice message waiting to the telephone video server. Now when a customer has a voice message on the telephone company voice messaging system, an indication may be sent to their TV. The voice messaging system could also be enhanced to accept caller ID information and this could now be included in the voice message waiting indicator sent to the set top box 21 for display on the screen.

Voice messaging could also be enhanced to support real-time audio MPEG encoding. With this option, the voice message upon the request by the user using the TV remote can request the message to be sent to the TV. The STB telephone service API would then stop the audio associated with the broadcast channel and decode the voice messaging MPEG audio and send this audio to the TV. With the STB telephone API being active, you have a two-way path to navigate through all the voice messages and save or delete them. The user can terminate this session at any time and resume receiving the audio from the selected broadcast station.

Speed dialing can now be viewed and changed from the TV. By linking the central office translations containing speed dialing information associated with a customer's plain old telephone system (POTS) number entered in the service profile of the telephone video server, you can retrieve the active speed dialing numbers and send this information to the STB over the IPPV PVC. This information will be displayed on the TV screen based on the telephone service API. This does require the user to be tuned to the telephone service channel and the broadcast MPEG2 video stream will be blocked from displaying on the screen and the API would take over providing background and proper font display for the service. The user can terminate at any time or when the channel is changed to another channel it would force the API to go back to a default of receiving the telephone MPEG stream when this channel is selected again.

Customer billing information can be linked to the telephone video server and in turn be received from the telephone video channel and displayed on the TV in the same manner as the speed dialing. Customer telephone service change requests can also be linked to the TV using the same procedure as customer billing information.

The above examples can be expanded on as required because we now have a two-way interactive service for telephone service to the TV in accordance with the present invention. Future AIN services can be added to the architecture of retaining security for the user guaranteeing that they only have access to information that belongs to them. A password could be added for parental screening or any telephone change request.

While embodiments of the invention have been illustrated and described, it is not intended that these embodiments illustrate and describe all possible forms of the invention. Rather, the words used in the specification are words of description rather than limitation, and that various changes may be made without departing from the spirit and scope of the invention.

What is claimed is:

1. A method of providing video and data services to a user for use in a broadband video and data communication system including a headend having a video channel provider and a data service provider, the headend being connected to an asynchronous transfer mode network, the system including a host digital terminal connected to the asynchronous transfer mode network and communicating with the headend, the system including a network interface operative to communicate through the host digital terminal, the method comprising:

connecting a video server including a video source to the headend, the video server being connected to the video channel provider by an asynchronous transfer mode network, the video server being connected to the data service provider by a packet network, the video server having a video server address to receive communications from the data service provider;

connecting a selection device to the network interface to establish communication with the video channel provider and bidirectional communication with the data service provider;

sending a selection device address from the data service provider to the selection device;

sending the video server address to the selection device to allow the selection device to communicate with the video server through the data service provider;

upon selection of the video server video source with the selection device by the user, sending the video source from the video server, through the video channel provider, to the selection device;

sending an identification tag from the host digital terminal to the selection device;

sending, from the selection device to the video server at the video server address, the selection device address and the identification tag;

at the video server, identifying the selection device based on the identification tag;

at the video server, determining programming based on the identification tag; and sending the programming to the selection device, through the data service provider, by utilizing the selection device address.

2. The method of claim 1 wherein a network unit is located between the host digital terminal and the network interface, and wherein the identification tag includes a host digital terminal number, a network unit number, and a network interface number.

3. The method of claim 1 wherein the packet switched network is an Internet protocol network, and the selection device address and the video server address are Internet protocol addresses.

4. The method of claim 1 wherein the video server is a telephone video server that provides an application program interface to the selection device when the video channel is requested.

5. The method of claim 4 wherein the application program interface includes a plurality of different selectable services.

6. The method of claim 5 wherein the services include telephone order request.

7. The method of claim 5 wherein the services include voice messaging.

8. The method of claim 7 further comprising:

connecting the video server to a voice messaging server that utilizes the identification tag to uniquely identify the user and then retrieves any messages for the user that are stored at the voice messaging server.

9. The method of claim 8 wherein the services include caller identification.

10. The method of claim 5 wherein the services include speed dialing.

11. The method of claim 5 wherein the services include billing information access.

* * * * *